United States Patent [19]

Flechtner

[11] Patent Number: 4,598,747
[45] Date of Patent: Jul. 8, 1986

[54] TIRE TREAD RELIEF ELEMENTS HAVING UNDULATED OR BROKEN LINE INCISIONS

[75] Inventor: Charles Flechtner, Clermont-Ferrand, France

[73] Assignee: Compagnie Generale des Etablissements Michelin, Clermont-Ferrand, France

[21] Appl. No.: 721,295

[22] Filed: Apr. 9, 1985

Related U.S. Application Data

[63] Continuation of Ser. No. 592,592, Mar. 23, 1984, abandoned.

[30] Foreign Application Priority Data

Apr. 12, 1983 [FR] France .............................. 83 06072

[51] Int. Cl.⁴ .............................................. B60C 11/12
[52] U.S. Cl. ...................... 152/209 R; 152/DIG. 1; 152/DIG. 3; 152/523; 425/28 D
[58] Field of Search .......... 152/209, DIG. 1, DIG. 3, 152/523; 156/128.6, 129, 130.5; 425/46, 28 R, 28 D, 35, 37

[56] References Cited

U.S. PATENT DOCUMENTS

| | | | |
|---|---|---|---|
| 2,122,736 | 7/1938 | Bourdon | 152/209 R |
| 2,983,005 | 5/1961 | Spier | 152/209 R |
| 3,199,567 | 8/1965 | Kunz et al. | 425/46 |
| 3,570,571 | 3/1971 | Riches | 152/209 R |
| 3,608,602 | 9/1971 | Youngblood | 152/212 |
| 4,298,046 | 11/1981 | Herbelleau et al. | 152/209 R |
| 4,303,115 | 12/1981 | Flechtner et al. | 425/46 |

FOREIGN PATENT DOCUMENTS

| | | | |
|---|---|---|---|
| 1169651 | 5/1964 | Fed. Rep. of Germany | 425/37 |
| 1480932 | 3/1969 | Fed. Rep. of Germany | . |
| 2128873 | 12/1972 | Fed. Rep. of Germany | 152/209 R |
| 3118407 | 12/1982 | Fed. Rep. of Germany | . |
| 1528052 | 4/1902 | France | . |
| 779108 | 3/1935 | France | . |
| 2418719 | 9/1979 | France | . |
| 58967 | 6/1969 | Luxembourg | . |
| 588170 | 5/1947 | United Kingdom | 425/47 |
| 763816 | 12/1956 | United Kingdom | 152/209 |
| 867556 | 5/1961 | United Kingdom | . |
| 1150295 | 4/1969 | United Kingdom | . |

Primary Examiner—Lois E. Boland
Attorney, Agent, or Firm—Brumbaugh, Graves, Donohue & Raymond

[57] ABSTRACT

A tire tread comprises elements in relief which are provided with undulated or broken line incisions. These incisions, which are of a width of less than 1 mm, have smaller amplitudes at the bottom of the incisions than at the surface of the tread.

10 Claims, 7 Drawing Figures

TIRE TREAD RELIEF ELEMENTS HAVING UNDULATED OR BROKEN LINE INCISIONS

This application is a continuation of application Ser. No. 592,592, filed on Mar. 23, 1984, now abandoned.

The present invention concerns tire treads whose elements in relief (blocks or ribs) are provided with incisions which are intended to increase the adherence of the tire to the ground.

Such treads are described, for instance, in French Pat. Nos. 779,108 and 1,528,052. The incisions may have walls which touch each other or are located at distances apart from each other on the order of 0.5 mm, and generally less than 1 mm. They may be of three types:

(1) either included within the contours of given elements in relief, (2) or originate within certain elements in relief and debouch on one side into one of the grooves defining these elements in relief, (3) or pass through given elements in relief of the tread and debouch through them into grooves defining said elements.

The effectiveness of the incisions is a function of their length, their average orientation with respect to the longitudinal direction of the tire, and their depth. For this reason and in order to avoid the drawbacks of a multiplying of the number of incisions, it has been proposed to replace linear incisions by incisions of an undulated, for instance sinusoidal trace, or of a broken line trace, for instance a zig-zag trace, the wavelength of the undulations or broken lines being less than the length of the incisions and the crest-to-crest amplitude being between 0.5 times and 1.5 times the wavelength.

In order to simplify manufacture in vulcanization molds, these incisions are of identical trace or shape from the surface of the elements in relief which is intended to come into contact with the ground down to the bottom of the incisions. This bottom is customarily located at the level of the grooves which define the elements in relief having the incisions, that is to say at the level of the bottom of the tread and at a slight radial distance from the reinforcement of the tire.

In particular, when two broken line or undulated incisions are close together and are of substantially parallel direction or when a broken line or undulated incision is close to a groove of the tread, they define with each other a volume of rubber which is called a rubber slice. This volume is defined by the walls of the two incisions or of the incision and the groove, by its surface on the tread and by its anchoring surface concentric to the surface of the tread and located at the level of the base of the shallowest incision. When the anchoring surface of a slice is such that its width (by convention, distance between the crests of said incision which are furthest apart, or distance between the crest of the incision which is furthest away and the wall of the groove) is less than the length of the slice (by convention, distance measured on the anchoring surface parallel or substantially parallel to the average direction of the said incisions between the end points of the shortest incision) and the radial height of the slice (by convention, distance measured perpendicular to the surface of the tread between said surface and the bottom of the shallowest incision), cracks form at the base of the slices and can propagate themselves until they result in the tearing of the slice of rubber off from the tread.

This drawback can be attributed to the fact that, under the effect of the forces in the contact area of the tire, the stresses in the rubber forming the slices are maximum at the level of the crests of the undulations or broken lines of the incisions. These crests are, in fact, the parts furthest away from the mean flexure fiber of the rubber slices. This results in substantial fatigue of the rubber at the level where the crests of the slices are implanted in the bottom of the tread.

The object of the present invention is to avoid the formation and propagation of such cracks while retaining the advantages of the undulated or broken line incisions.

It has already been proposed to eliminate the cracks in the rubber which originate at the place where individual incisions debouch into the bottom of the grooves defining elements in relief (incisions of types 2 and 3 above) by replacing these incisions by incisions (of type 1 above) which do not debouch into the delimiting grooves. It has even been proposed to produce incisions of variable depth, the depth being then a function of the direction of each segment of the broken line representing the incision. However, the principle of the present invention is different from this and although it applies, preferably, to undulated or broken line incisions of types 2 and 3 and to incisions of constant depth, it is independent of the type of incision. The principle consists in imparting to the incisions a smaller amplitude, and preferably an amplitude of zero, at the bottom of the incisions than at the level of the surfaces of contact with the ground of the elements in relief of the tread. Stated differently, in accordance with the invention, the amplitude of the incisions decreases in the direction towards the bottom of the incisions.

Thus, the invention concerns a tire tread comprising elements in relief which are provided with undulated or broken line incisions of a wavelength and amplitude which are small as compared with the dimensions of the elements in relief, characterized by the fact that the incisions have smaller amplitudes at the bottom of the incisions than at the surface of the tread, these amplitudes being preferably zero at the bottom of the incisions.

As the principle of the invention is to use incisions whose amplitudes are smaller at the bottom than at the surface of the tread, incisions whose amplitudes decrease linearly as a function of the depth can be employed. However, it is advantageous to use incisions whose amplitudes are constant over a given depth which is less than the depth of the incisions, and then decrease in the direction towards the bottom of the incisions.

In the event that the elements in relief of the tread comprise several slices of rubber, in order not to increase the average stresses of one slice with respect to the other at the base of these slices, the transformation of the undulated or broken line of given amplitude to a smaller or zero amplitude is effected at the constant anchoring surface by adaptation of the width of the slice. However, the implantation of a slice can be reinforced, if necessary, by imparting to it a width which is constant from the surface of the tread to the anchoring surface at the bottom of the incisions.

The use of the invention has been found particularly advantageous in combination with a radial tire reinforcement crowned by a tread reinforcement which stiffens the tread and/or slices of rubber arranged, within the relief elements, either parallel to the longitudinal direction of the tire or obliquely or transversely with respect to that direction.

The invention applies as advantageously to incisions perpendicular to the surface of the tread as to incisions which are inclined with respect to a plane normal to said surface, such incisions being described in French Pat. No. 2,418,719.

The accompanying drawing shows by way of illustration and not of limitation, several embodiments of the invention which are described in the following description which refers thereto.

Figure 1:
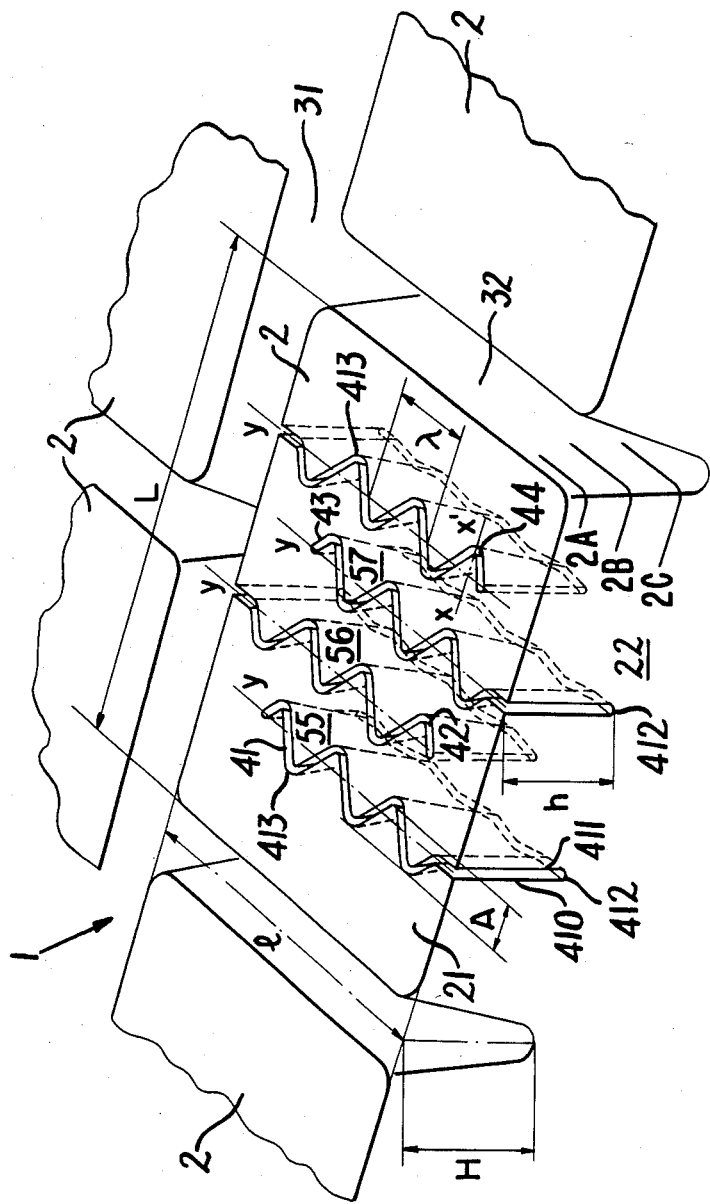
FIG. 1 is a perspective view of a portion of a tire tread having elements in relief which are provided with incisions in accordance with the invention.

The portion of the tire tread 1 shown in FIG. 1 comprises blocks 2 in relief. The blocks 2 are rectangular with rounded edges, of a length L and a width l at the surface 21 of the tread 1. These blocks 2 are separated from each other, on the one hand, by longitudinal grooves 31 parallel to the longitudinal direction of the tire (by longitudinal grooves there are understood grooves which form an angle of between 0° and 20° with the longitudinal direction of the tire) and, on the other hand, by transverse grooves 32 (by transverse grooves there are understood grooves which form an angle of between 70° and 110° with the longitudinal direction of the tire). These grooves 31, 32 have a depth H.

The blocks 2 have incisions 41, 42, 43, 44 in accordance with the invention. On the surface 21 of the tread 1, the incisions 41 to 44 are undulated with transverse average directions (represented by the axes y) parallel to the transverse grooves 32 (directions the axes of which form an angle of between 0° and 20° are referred to as parallel). The incisions 41 to 44 originate within the interior of the block 2 and debouch alternately, some 41, 43 into one of the longitudinal grooves 31 and the others 42, 44 into the other longitudinal groove 31 defining the block 2 on the opposite side (incisions of type 2 described above).

The incisions 41 to 44 are in succession adjacent to each other in the longitudinal direction of the tire, thus defining a slice of rubber 55 between the facing portions of the adjacent incisions 41 and 42, a slice of rubber 56 between the facing portions of the adjacent incisions 42 and 43 and a slice of rubber 57 between the facing portions of the adjacent incisions 43 and 44. The wavelength $\lambda$ of the undulations of the incisions 41 to 44 (constant in the case of FIG. 1 for clarity in the drawing), measured on the surface 21 of the tread, that is to say the block 2, is equal to 1.15 times the amplitude A measured from crest to crest. The wavelength $\lambda$ and the amplitude A of the incisions are small as compared with the dimensions l and L on the surface of the tread of the block in relief, without, however, being proportional to the dimensions l and L. On the other hand, the dimensions of the slices (average length and average width) are selected as a function of the desired mobility which it is desired to impart to the element in relief.

The incisions 41 to 44 have walls 410, 411 each represented by separate lines 410, 411. Within the scope of the present invention, the distance e (FIG. 2A) between the walls 410, 411 of the incisions 41 to 44 is, in general, less than 1 mm, and is practically zero in the event that the walls 410, 411 touch each other. The incisions 41 to 44 extend over a constant radial depth h in the block 2. Thus the bottom of the incisions 41 to 44 is located at a depth h close or equal to the depth H of the grooves 31, 32 surrounding the block 2 but not exceeding the depth H. From the surface 21 of the block 2 to the bottom 412 of the incisions 41 to 44, the wavelength $\lambda$ is preferably constant for the same undulation, as shown in FIGS. 2A to 2C.

Figure 2A:
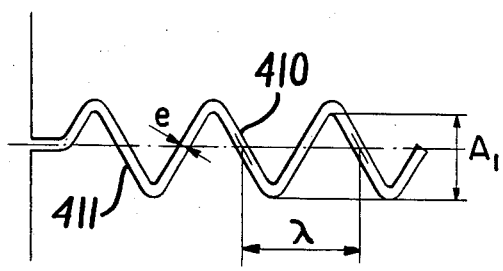
FIGS. 2A, 2B and 2C are plane sections (at levels 2A, 2B and 2C in FIG. 1) parallel to the travel surface of an incision of the tire tread of FIG. 1.
Figure 2B:
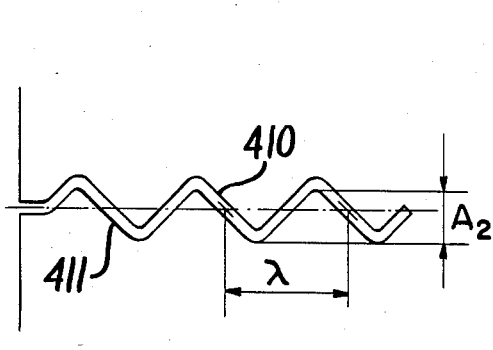
Figure 2C:
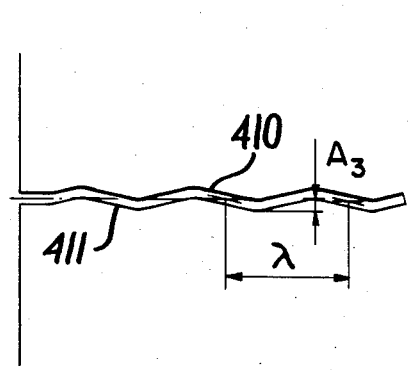

On the other hand, according to the invention, the amplitude A of the undulations 41 to 44 decreases from the surface 21 of the block 2 in the direction towards the bottom 412 of the incisions, as shown in FIGS. 2A to 2C. These figures consist of flat sections taken at different depths or levels parallel to the travel surface 21 of the portion of the block 2 containing an incision such as 43. Thus at the level 2A, the level closest to the travel surface 21, the amplitude $A_1$ is less than the amplitude A at the travel surface 21 of the block 2. At level 2B, intermediate between the previous level 2A and the bottom 412 of the incision 43, the amplitude $A_2$ is less than the amplitude $A_1$ at the level 2A but greater than the amplitude $A_3$ at the level 2C of the bottom 412 of the incision 43 located at the radial distance h from the surface of the block 2.

Figure 3:
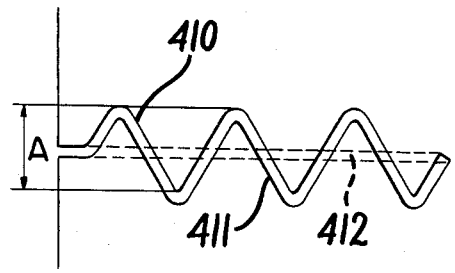
FIGS. 3 to 5 show other variants of the invention.

In another variant of the incisions 41–44 according to the present invention, the amplitude $A_3$ at the level 2C of the bottom 412 is zero. Stated differently, the bottom 412 of the incisions is, for instance, linear. In FIG. 3 there are shown, super-posed on each other, the amplitudes A of one such incision at the surface 21 of the block 2 and at the linear bottom 412 of the incision.

Figure 4:
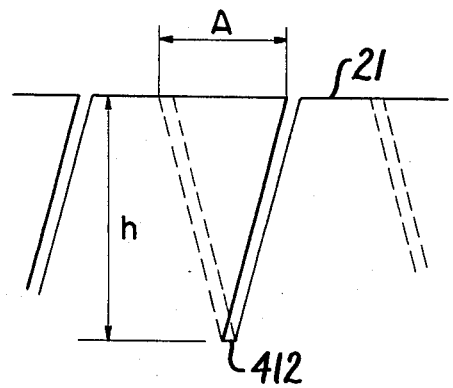

In order to simplify the machining of the corresponding elements in relief of the vulcanization mold, it is advantageous that the decrease in the amplitude A in the direction towards the bottom 412 of the incisions be linear, as indicated in FIG. 4 (seen along the section XX' in FIG. 1 of the incision 44).

Figure 5:
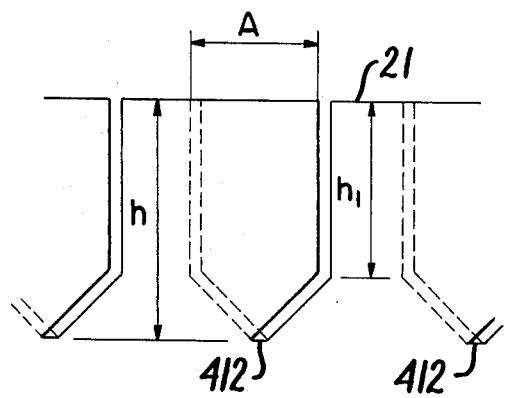

A third preferred variant (FIG. 5) of the invention provides that the amplitude of the incisions remains constant and equal to the amplitude A at the surface 21 of the block 2 over a depth $h_1$ which is less than the depth h of the incisions. From the depth $h_1$ to the bottom 412 of the incisions 41 to 44 the amplitude of the undulations decreases in accordance with the invention.

The undulations of two adjacent incisions 41, 42; 42, 43; 43, 44 forming a rubber slice 55, 56, 57 are also preferably parallel at least at the surface 21 of the block 2. However, it is advantageous to retain this parallelism over the entire depth h of the incisions 41 to 44, in order to simplify the manufacture of the corresponding elements in relief of the vulcanization mold.

The decrease in the amplitudes of the undulations of the incisions according to the invention in the direction towards the bottom of the incisions results in a better distribution of the stresses at the level of the crests 413 of the incisions forming the rubber slices 55 to 57, in particular at the bottom 412 of the incisions, that is to say at the level of the implantation of the slices 55 to 57 in the non-incised portion 22 of the tread, contained between the bottom of the incisions 41 to 44 and the tread reinforcement (not shown) of the tire. In this way, one avoids the formation in the rubber of fatigue cracks which extend from the crests at the bottom 412 of the incisions of constant amplitude and are capable of even causing the tearing off of the rubber slices 55 to 57.

What is claimed is:

1. A tire tread comprising elements in relief which are provided with undulated or broken line incisions of a wavelength and an amplitude which are small as compared with the dimensions of the elements in relief, characterized by the fact that the incisions have smaller amplitudes at the bottom of the incisions than at the surface of the tread, the amplitudes, starting from the surface of the tread, decreasing linearly as a function of the depth.

2. A tire tread comprising elements in relief which are provided with undulated or broken line incisions of a wavelength and an amplitude which are small as compared with the dimensions of the elements in relief, characterized by the fact that the incisions have smaller amplitudes at the bottom of the incisions than at the surface of the tread, the amplitudes, starting from the surface of the tread, being constant over a depth less than the depth of the incisions and then decreasing linearly to the bottom of the incisions.

3. A tire tread according to claim 1 or 2, characterized by the fact that the amplitudes are zero at the bottom of the incisions.

4. A tire tread according to claim 1 or 2, characterized by the fact that the elements in relief have, in known manner, adjacent parallel incisions close together defining rubber slices between each other, areas of concentric cross sections of each rubber slice being constant from the surface of the tread to the anchoring surface at the bottom of the incisions.

5. A tire tread according to claim 1 or 2, characterized by the fact that the elements in relief have, in known manner, adjacent parallel incisions close together defining rubber slices between each other, the width of one or more rubber slices being constant from the surface of the tread to the anchoring surface at the bottom of the incisions.

6. A tire tread according to claim 4, characterized by the fact that the rubber slices, in known manner, are arranged parallel, oblique or transverse with respect to the longitudinal direction of the tire.

7. A tire tread according to claim 5, characterized by the fact that the rubber slices, in known manner, are arranged parallel, oblique or transverse with respect to the longitudinal direction of the tire.

8. A tire tread according to claim 4, characterized by the fact that the rubber slices, in known manner, are inclined with respect to a plane normal to the surface of the tread.

9. A tire tread according to claim 5, characterized by the fact that the rubber slices, in known manner, are inclined with respect to a plane normal to the surface of the tread.

10. A tire characterized by the fact that it comprises a tread according to claim 1 or 2.

* * * * *